United States Patent [19]
Mao et al.

[11] Patent Number: 6,111,675
[45] Date of Patent: Aug. 29, 2000

[54] SYSTEM AND METHOD FOR BI-DIRECTIONAL TRANSMISSION OF TELEMETRY SERVICE SIGNALS USING A SINGLE FIBER

[75] Inventors: Xiaoping Mao, Plano; Glenn Wellbrock, Wylie; Harold Clay Wispell, II, Frisco, all of Tex.

[73] Assignee: MCIWorldCom, Inc., Jackson, Miss.

[21] Appl. No.: 08/917,817

[22] Filed: Aug. 27, 1997

[51] Int. Cl.[7] .................................................. H04J 14/02
[52] U.S. Cl. ........................... 359/124; 359/114; 359/110
[58] Field of Search .......................... 359/110, 113–114, 359/124, 143; 340/854.7

[56] References Cited

U.S. PATENT DOCUMENTS 5,113,459   5/1992   Grasso et al. .............................. 385/24

OTHER PUBLICATIONS

"High Capacity Optical Transmission Explained," Edited by D.M. Spirit and M.J. O'Mahony, 1995, pp. 22–24 and pp. 228–239.

Keong, "Optical Fiber System for Video and Telemetry Signal Transmission", Proceedings of IEEE Singapore Internationsl Conference on Networks/International Conference on Information Engineering '93, vol. 1, pp. 71–75, Sep. 1993.

*Primary Examiner*—Kinfe-Michael Negash

[57] ABSTRACT

A bi-directional telemetry service channel is provided on a single optical fiber using two wavelengths that are accessible through multiplexing devices. A bi-directional telemetry service channel is also provided on a single optical fiber using only a single wavelength. A fully protected bi-directional telemetry service channel can be provided using only two optical fibers. When a single wavelength is used, a time window is provided for transmission of telemetry service signals in one direction on the optical fiber at the single wavelength, and a second time-window is provided for transmission of telemetry service signals in the opposite direction on the same optical fiber using the same wavelength.

5 Claims, 14 Drawing Sheets

SYSTEM AND METHOD FOR BI-DIRECTIONAL TRANSMISSION OF TELEMETRY SERVICE SIGNALS USING A SINGLE FIBER

BACKGROUND OF THE INVENTION

1. Field of the Invention

The present invention relates to optical fiber communication systems. More particularly, the present invention relates to bi-directional telemetry and service channels for use with optical fiber communication systems.

2. Related Art

Optical fibers can be used to carry signals over great distances. As such, optical fibers are advantageous for use in a communication system to carry communication signals representing, for example, customer voice, data, or video (referred to herein as "customer traffic" or "commercial traffic"). Such an optical fiber communication system also advantageously provides some mechanism for the transmission of service communications. Service communications can include, for example, telemetry signals that provide control or command signals, or status signals, for equipment located within the optical fiber communication system. Service communications can also include service signals representing voice communication between maintenance personnel located at various sites within the optical fiber communication system.

One conventional method for providing telemetry signals (e.g., alarms, temperature conditions, equipment failure, etc.) is through the use of a Synchronous Optical Network (SONET). The SONET data structure is split into a "payload" area that carries customer traffic, and an "overhead" area that includes dedicated bits for communication between network elements. The SONET overhead area enables communication for Operations, Administration and Maintenance (OA&M) between parts of the network via the transmission path carrying customer traffic, rather than needing physically separate signaling networks. The telemetry information is available once the optical signals are converted into electronic signals. Such conversion is done to recover and clean up the signals. However, the amount of information that can be sent via the overhead area is fixed by the number of dedicated bits.

Alternatively, telemetry signals can be provided in optical form by using wavelengths outside of the wavelength window used for carrying customer traffic. For example, conventional equipment available from Pirelli Cavi S.p.A., Milan, Italy uses wavelengths in the range from 1200 to 1400 nm (nanometers) to carry service signals, and wavelengths in the range from 1500 to 1600 to carry customer traffic. Such conventional equipment is described in U.S. Pat. No. 5,113,459, the entirety of which is incorporated herein by reference. Such conventional equipment provides for the transmission of telemetry signals at the selected wavelength (for example, 1310 nm) in one direction on one fiber. In order to transmit telemetry signals in the opposite direction using such conventional equipment, a second fiber is needed. Therefore, two fibers are required to provide for bi-directional transmission of telemetry signals.

Two fibers can be used to provide redundancy in an optical fiber communication system. One fiber can be used as the primary or "working" fiber, and the second fiber can be used as the secondary or "protection" fiber. Because two fibers are required to provide for bi-directional transmission of telemetry signals, two fibers cannot provide redundancy for bi-directional transmission of telemetry service signals. Rather, more than two fibers are conventionally required to provide a "protected" bi-directional telemetry signal. If the working fiber fails and communication is switched to the protection fiber in a conventional system, then bi-directional transmission of telemetry signals is lost. In such a scenario, telemetry signals could only be uni-directionally transmitted in the single direction provided by the protection fiber.

Thus, there is a need in the art for a system and method that provides for the bi-directional transmission of telemetry signals using a single fiber. There is a further need in the art for a system and method that provides for a fully-protected bi-directional telemetry service channel using only two fibers.

SUMMARY OF THE INVENTION

In one aspect, the present invention is directed to a system for providing a bi-directional telemetry service channel on a single optical fiber at a single wavelength. The system includes means for providing a first time window for transmission of a first telemetry service message from a first site to a second site. The first site includes a first transmitter that converts electrical signals to optical signals, and a first receiver that converts optical signals to electrical signals. The second site includes a second transmitter that converts electrical signals to optical signals, and a second receiver that converts optical signals to electrical signals. The first time window is provided by maintaining the first transmitter on, the first receiver off, the second receiver on, and the second transmitter off, for a first time period. The system also includes a means for providing a second time window for transmission of a second telemetry service message from the second site to the first site. The second time window is provided by maintaining the second transmitter on, the second receiver off, the first receiver on, and the first transmitter off, for a second time period. The single optical fiber carries the first telemetry service message and the second telemetry service message at the single wavelength.

The system can also include dividing means that divides the first telemetry service message into a first plurality of segments, and dividing means that divides the second telemetry service message into a second plurality of segments. Transmitting means are provided for alternately transmitting one segment from the first plurality of segments, and the second plurality of segments, until each of the first and second plurality of segments has been transmitted. In further aspects, the system can also include prioritizing means that prioritizes either the first plurality of segments and/or the second plurality of segments. In such an aspect of the present invention, the transmitting means sequentially transmits the prioritized segments in the order from highest priority to lowest priority.

A further aspect of the present invention is a method for providing a bi-directional telemetry service channel on a single optical fiber at a single wavelength. The method includes the following steps:

(a) providing a first time window for transmission of a first telemetry service message from a first site to a second site by maintaining the first transmitter on, the first receiver off, the second receiver on, and the second transmitter off, for a first time period; and (b) providing a second time window for transmission of a second telemetry service message from the second site to the first site by maintaining the second transmitter on, the second receiver off, the first receiver on, and the first transmitter off, for a second time period, with the single optical fiber carrying the first telemetry service message and the second telemetry service message at the single wavelength.

In further aspects of the method of the present invention, the following steps are also performed:

(c) dividing the first telemetry service message into a first plurality of segments;

(d) dividing the second telemetry service message into a second plurality of segments;

(e) transmitting one of the first plurality of segments during the first time window;

(f) transmitting one of the second plurality of segments during the second time window; and (g) alternately repeating steps (e) and (f) until each of the first and second plurality of segments has been transmitted.

The method of the present invention can also include steps of prioritizing the first and/or the second plurality of segments to form a set of prioritized segments having an order from highest priority to lowest priority. In such a method, steps (e) and/or (f) and (g) are carried out to sequentially transmit the prioritized segments in the order from highest priority to lowest priority.

In a further aspect of the present invention, an optical fiber communication system for the bi-directional transmission of communication and telemetry service signals is provided. The communication system includes first and second transmitters for converting electrical telemetry service signals to optical telemetry service signals, first and second receivers for converting optical telemetry service signals to electrical telemetry service signals, first and second control means for controlling operation of the first and second transmitters and receivers, and first and second multiplexing devices optically coupled to the first and second transmitters and receivers. An optical fiber is optically coupled to the first and second multiplexing devices for carrying optical communication signals and optical telemetry service signals. The first and second control means maintain the first transmitter on, the first receiver off, the second receiver on, and the second transmitter off, for transmission of optical telemetry service signals from the first multiplexing device to the second multiplexing device. The first and second control means maintain the second transmitter on, the second receiver off, the first receiver on, and the first transmitter off, for transmission of optical telemetry service signals from the second multiplexing device to the first multiplexing device.

In yet a further aspect of the present invention, another optical fiber communication system for the bi-directional transmission of communication and telemetry service signals is provided. Such an optical fiber communication system includes a first multiplexing device that sends optical communication signals of a first wavelength, receives optical communication signals of a second wavelength, sends optical telemetry service signals of a third wavelength, and receives optical telemetry service signals of a fourth wavelength. The system also includes a second multiplexing device that receives the optical communication signals of the first wavelength, sends the optical communication signals of the second wavelength, receives the optical telemetry service signals of the third wavelength, and sends the optical telemetry service signals of the fourth wavelength. An optical fiber is optically coupled to the first multiplexing device and to the second multiplexing device for carrying the optical communication signals at the first and second wavelengths, and the optical telemetry service signals at the third and fourth wavelengths. In a particularly preferred aspect of such an optical fiber communication system, one of the wavelengths used for the optical telemetry service signals is preferably 1510 nm.

Features and Advantages

It is a feature of the present invention that a bi-directional telemetry service channel is provided using a single optical fiber.

It is a further feature of the present invention that a bi-directional telemetry service channel is provided using only a single optical fiber and a single wavelength.

It is yet a further feature of the present invention that a fully protected bi-directional telemetry service channel can be provided using only two optical fibers.

It is an advantage of the present invention that a filly protected bi-directional telemetry service channel can be provided that is compatible with the wavelengths specified for telemetry by the International Telecommunications Union.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Overview

Figure 1:
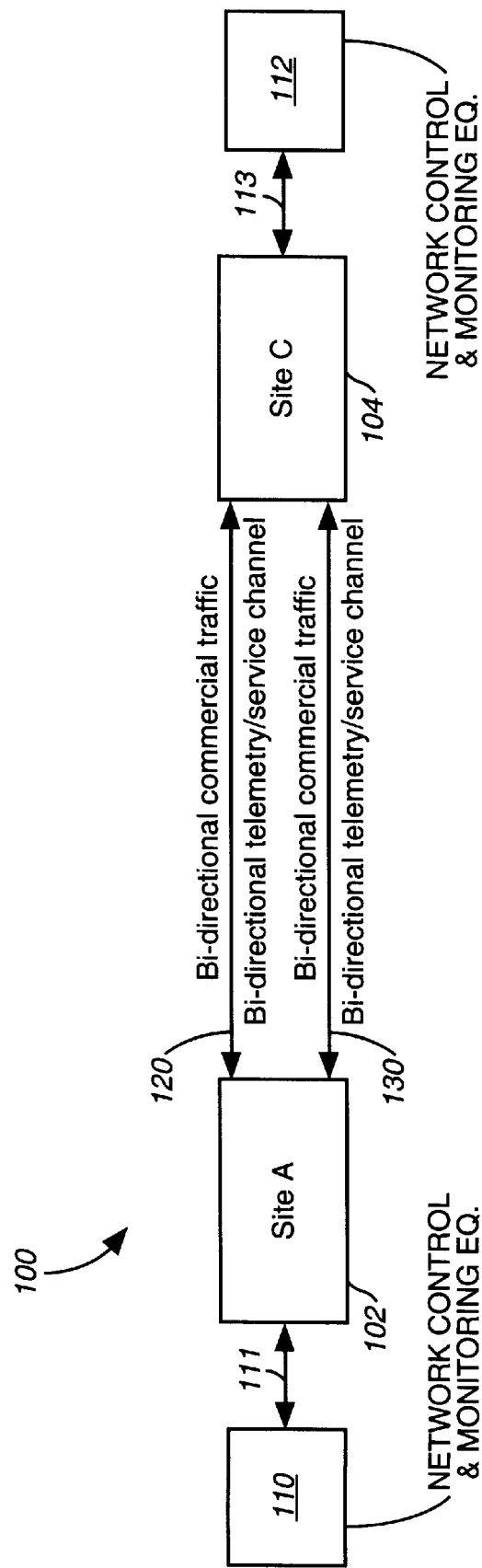
FIG. 1 is a block diagram illustrating one embodiment of a bi-directional communication system of the present invention.

To provide continuity and reliability in an optical fiber communication system, redundancy can be provided in the form of a "working" system backed up by a "protection" system. The protection system is typically a duplicate of the working system, and includes the same or substantially the same components as the working system. If the working system fails, for example, a break in the optical fiber or failure of one of the components, the protection system takes over to provide communication. In this manner, it is possible to provide full protection for channels carrying customer traffic. However, conventional optical fiber communication systems do not provide full protection for telemetry.

The present invention was developed in order to provide full protection for telemetry. The system and method of the present invention provides for bi-directional transmission of telemetry service signals using a single fiber. In this manner, only two fibers are required to provide redundancy and full protection for the bi-directional transmission of telemetry service signals.

In one embodiment of the present invention, a bi-directional telemetry service channel is provided on a single optical fiber using two wavelengths. Through the use of suitable multiplexing devices, telemetry service signals are transmitted in one direction on an optical fiber at a first wavelength, and transmitted in the opposite direction on the same optical fiber using a second wavelength that is different from the first wavelength. In this manner, bi-directional transmission of telemetry service signals can be done on a single optical fiber. Thus, a fully protected bi-directional telemetry service channel can be provided using only two optical fibers.

In an alternative embodiment of the present invention, a bi-directional telemetry service channel is provided on a single optical fiber using only a single wavelength. In such a system, a "time window" or time slot is provided for transmission of telemetry service signals in one direction on the optical fiber, and a second time window or time slot is provided for transmission of telemetry service signals in the opposite direction on the same optical fiber. Telemetry service signal information or messages are alternately transmitted in the two directions using the same optical fiber and the same wavelength. This "walkie-talkie" approach allows for the bi-directional transmission of telemetry service signals on the single optical fiber at the single wavelength. Thus, a fully protected bi-directional telemetry service channel can be provided using only two optical fibers.

In one embodiment of the "walkie-talkie" method, a complete telemetry service signal message is sent in one direction, followed by sending a complete telemetry service signal message in the opposite direction. In an alternate embodiment, the telemetry service signal messages are divided into segments, and the segments are then alternately sent in the two directions. In order to send the most critical information as quickly as possible, the segments are prioritized in another embodiment to form a prioritized set of segments having an order from highest priority to lowest priority. The segments are then alternately transmitted in the order of priority so that the highest priority information is sent and received first.

System Description

With reference now to FIG. 1, a block diagram of one embodiment of a bi-directional communication system 100 of the present invention is shown.

Communication system 100 provides for the bi-directional transmission of commercial traffic and telemetry service signals between a Site A (shown as reference numeral 102) and a Site C (shown as reference numeral 104). Site A and Site C can be separated by varying distances, for example, a few kilometers, several hundred kilometers, or even several thousand kilometers. Site A and Site C are connected by two optical fibers, a working optical fiber 120 and a protection optical fiber 130. Optical fibers 120 and 130 each carry commercial traffic and telemetry service signals in a bi-directional manner. Communication system 100 is a "fully protected" system, having a working system for transmission on working optical fiber 120, and a protection system for transmission on protection optical fiber 130. Operations, Administration, Maintenance, and Provisioning (OAM&P) is provided for Site A by network control and monitoring equipment 110. By "provisioning" is meant sending a message to communication system 100 to carry out a particular function. Information such as equipment status information is part of the monitoring provided by network control and monitoring equipment 110. Network control and monitoring equipment 110 is connected to the Site A equipment through a connection 111. Similarly, network control and monitoring equipment 112 is connected to the Site C equipment through a connection 113.

Figure 2:
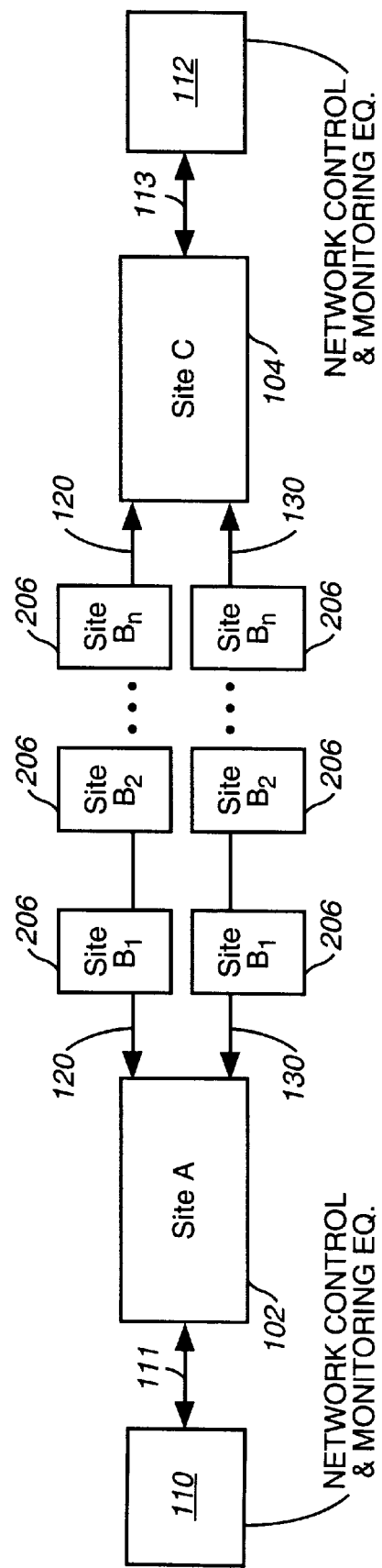
FIG. 2 is a block diagram illustrating an alternate embodiment of a bi-directional communication system of the present invention.

When Site A and Site C are separated by distances greater than approximately 70 to 90 kilometers, it is necessary to include within optical fiber communication system 100 one or more optical repeater sites 206 as shown in FIG. 2. Optical repeater sites 206 are denoted as Sites $B_1$, $B_2$, $B_N$, etc. Optical repeater sites 206 are provided on working optical fiber 120 as well as on protection optical fiber 130.

Figure 3:
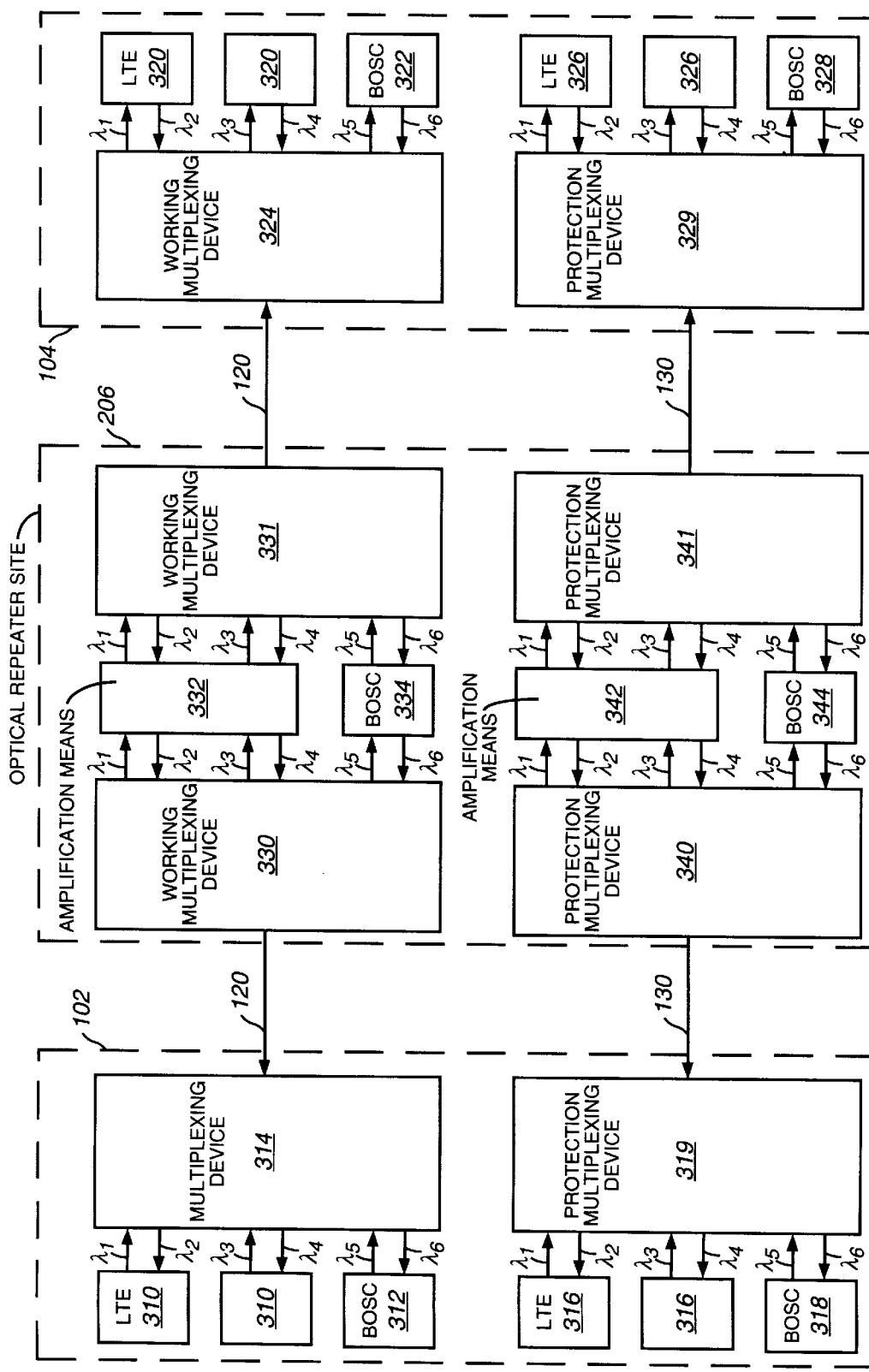
FIG. 3 is a block diagram illustrating one embodiment for providing a bi-directional telemetry service channel.

Turning now to FIG. 3, one embodiment for providing a bi-directional telemetry service channel is shown. FIG. 3 illustrates an optical fiber communication system that provides for the fully protected bi-directional transmission of customer traffic and telemetry service signals between one site (Site A 102) and a second site (Site C 104). FIG. 3 shows one optical repeater site 206 located between Site A and Site C. It is to be understood that more than one optical repeater site 206 can be used.

In the optical fiber communication system shown in FIG. 3, the working system is shown in the upper half of FIG. 3, using working optical fiber 120. The protection system is shown in the lower half of FIG. 3, using protection optical fiber 130. Site A 102 and Site C 104, as well as optical repeater site 206, each contain equipment that is used for the working system as well as equipment that is used for the protection system.

The working system at Site A includes a multiplexing device 314 that is optically coupled to working optical fiber 120. As used herein, the term "multiplexing device" refers to a device that is configured to multiplex or combine a number of different wavelengths onto a single optical fiber, and to demultiplex or separate out individual wavelengths carried on an optical fiber. Preferably, the multiplexing devices used in the system of the present invention are wavelength division multiplexing (WDM) devices, or optical frequency division multiplexing (OFDM) devices. Such devices multiplex and demultiplex wavelengths using passive components in a manner readily known to one of skill in the relevant art. WDM and OFDM devices exploit the large potential bandwidth of fiber by multiplexing a number of channels at different wavelengths onto a single fiber while keeping the bit rate of individual channels low enough to minimize dispersion effects. Such a multiplexing device combines wavelengths onto a single fiber and separates out the individual wavelengths from the fiber so that individual detection of each wavelength can be performed.

The working system at Site A also includes one or more line terminating equipment (LTE) 310. LTE 310 is used to send and receive commercial traffic from and to Site A. As shown in FIG. 3, Site A 102 includes two LTE 310. One LTE 310 sends and receives commercial traffic at a wavelength $\lambda_1$ and a wavelength $\lambda_2$, respectively. The second LTE 310 sends and receives commercial traffic using a wavelength $\lambda_3$ and a wavelength $\lambda_4$, respectively.

The working system at Site A 102 also includes bi-directional optical service channel (BOSC) equipment 312 for sending and receiving telemetry service signals from and to Site A. BOSC 312 sends telemetry service signals at a wavelength $\lambda_5$ and receives telemetry service signals at a wavelength $\lambda_6$. Equipment suitable for use as LTE and BOSC equipment will be described in more detail below with respect to FIG. 6.

The protection system at Site A 102 contains substantially identical equipment to the working system at Site A 102. Particularly, a protection multiplexing device 319 is provided for sending and receiving optical signals on protection optical fiber 130. Protection LTEs 316 are used to send and receive customer traffic at wavelengths $\lambda_1$, $\lambda_2$, $\lambda_3$, and $\lambda_4$, as shown in FIG. 3. A protection BOSC 318 is used to send and receive telemetry service signals at wavelengths $\lambda_5$ and $\lambda_6$, respectively.

The working and protection systems at Site C 104 are analogous to those at Site A 102. A working multiplexing device 324 is optically coupled to working optical fiber 120. One working LTE 320 is used to receive and send customer traffic at $\lambda_1$ and $\lambda_2$, respectively. A second working LTE 320 is used to receive and send customer traffic at $\lambda_3$ and $\lambda_4$, respectively. A working BOSC 322 is used to receive and send telemetry service signals at $\lambda_5$ and $\lambda_6$, respectively. Similarly, a working protection multiplexing device 329 is optically coupled to protection optical fiber 130. One protection LTE 326 is used to receive and send customer traffic at $\lambda_1$, and $\lambda_2$, respectively. A second protection LTE 326 is used to receive and send customer traffic at $\lambda_3$ and $\lambda_4$, respectively. A protection BOSC 328 is used to receive and send telemetry service signals at $\lambda_5$ and $\lambda_6$, respectively.

Optical repeater site 206 includes a protection system and a working system. As shown in FIG. 3, the working system includes a working multiplexing device 330 optically coupled to working optical fiber 120 for sending and receiving optical signals from working multiplexing device 314 at Site A 102. A working multiplexing device 331 is optically coupled to working optical fiber 120 for sending and receiving optical signals from working multiplexing device 324 at Site C 104.

An optical amplification means 332 is used to amplify optical signals carried on working optical fiber 120. Amplification means 332 can include, for a example, a bi-directional line amplifier (BDLA) or line regenerating equipment (LRE), as known to one of skill in the relevant arts. One factor that is used to determine whether an LRE or a BDLA is used for amplification means 332 is the distance between the endpoint sites, such as Site A and Site C, and the number of optical repeater sites 206 that are used between the endpoint sites. A BDLA is typically used approximately every 70 kilometers of optical fiber distance. A BDLA is typically less expensive than an LRE, and is therefore preferably used wherever possible. However, when the optical signals have traveled a distance on the order of several hundred kilometers, the signal to noise ratio has typically degraded to such a point that it is necessary to insert an LRE to regenerate the signal and improve the signal to noise ratio. As such, an LRE would be preferably used for amplification means 332 approximately every 300 kilometers.

As shown in FIG. 3, customer traffic carried using wavelengths $\lambda_1$, $\lambda_2$, $\lambda_3$, and $\lambda_4$, is broken out at optical repeater site 206 and amplified by amplification means 332. Telemetry service signals carried on wavelengths $\lambda_5$ and $\lambda_6$ are also broken out at optical repeater site 206. Multiplexing devices 330 and 331 enable the optical signals carried at $\lambda_1$, through $\lambda_6$ to be broken out as shown in FIG. 3. A working BOSC 334 enables the telemetry service signal to be isolated at optical repeater site 206. Equipment suitable for use as LTE and BOSC equipment will be described in more detail below with respect to FIG. 6.

Optical repeater site 206 includes a protection system that is substantially identical to the working system. Protection multiplexing devices 340 and 341 are optically coupled to protection optical fiber 130 for bi-directional transmission of optical signals between Site A 102 and Site C 104. An amplification means 342 is used to amplify optical signals carried on protection optical fiber 130. As detailed above with respect to amplification means 332, amplification means 342 can include a BDLA or an LRE as needed. A protection BOSC 344 is provided to isolate the telemetry service signal.

The telemetry service channel that is provided by the system and method of the present invention can be used for the transmission of, for example, data, control and status signals, as well as voice traffic. The voice traffic carried by the telemetry service channel is used by maintenance personnel or service personnel who are working on the equipment in the optical fiber communication system. The maintenance and service personnel can be working either at an optical repeater site 206, or one of the endpoints such as Site A or Site C. The telemetry service channel can be used to carry status information or data that relates to the equipment in the optical fiber communication system. For example, the telemetry service channel can carry data that relates to the environmental conditions at the various optical repeater sites 206, such as temperature and humidity. Alternatively, the telemetry service channel can carry status information with respect to the equipment, such as the power level, current level and signal performance information. The telemetry service channel can also carry alarm information, such as component (equipment or optical fiber) failure, or when the system switches from the protection system to the working system or from the working system to the protection system. The telemetry service channel can also carry control signals that turn on or off various pieces of equipment in the system, or change the operating mode of one or more pieces of equipment in the communication system. The data sent over the telemetry service channel is typically low speed data with each message being less than two megabits, typically on the order of 64 kilobits. In contrast, the commercial traffic that is being sent on the optical fiber communication system is on the order of 40 gigabits.

Figure 4:
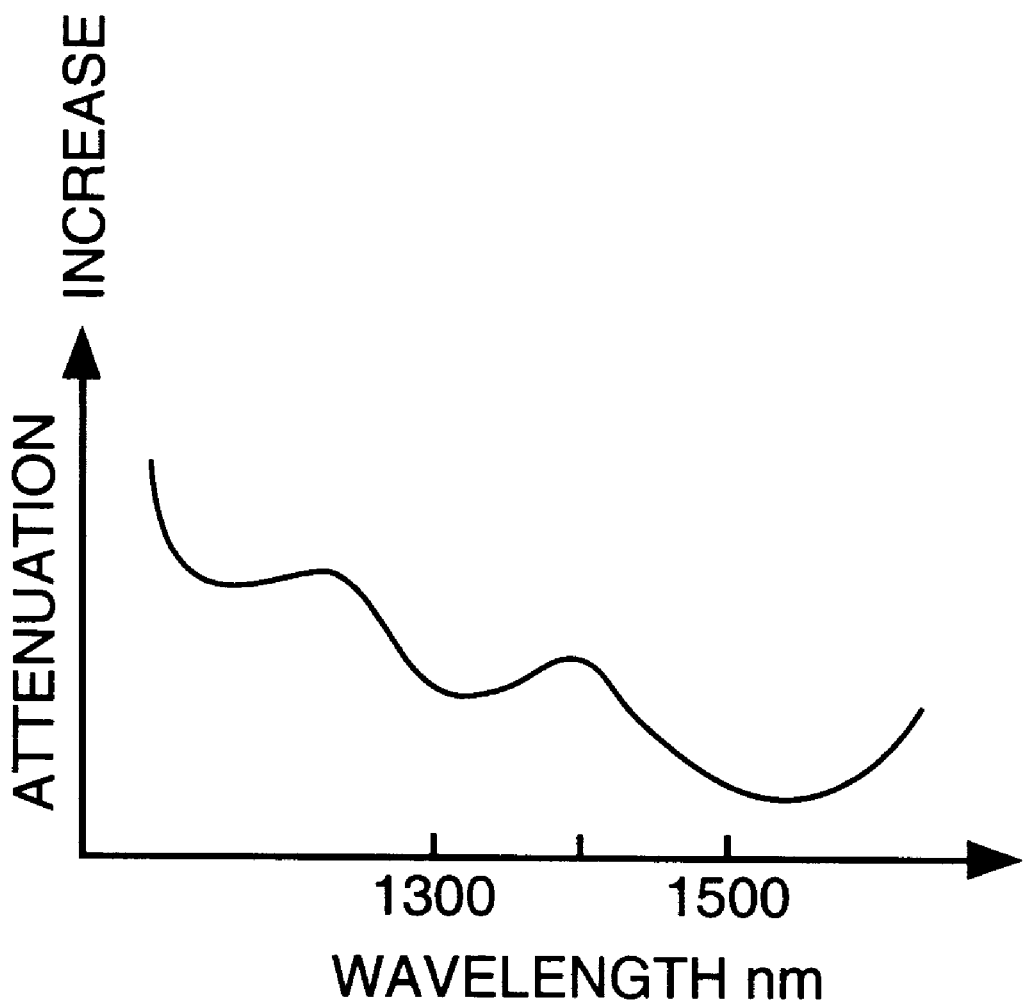
FIG. 4 is a graph illustrating the light attenuation in an optical fiber as a function of the wavelength ($\lambda$) of the injected light.

FIG. 4 is a graph illustrating the light attenuation in optical fiber as a function of the wavelength of the injected light. As shown in FIG. 4, a "third window" occurs in the range of from approximately 1500 to approximately 1600 nm where there is a minimum of light attenuation in silica glass fibers. Therefore, customer traffic is typically carried in the range between 1500 to 1600 nm. Therefore, in one embodiment of the present invention, $\lambda_1$ is preferably 1557 nm, $\lambda_2$ is preferably 1541 nm, $\lambda_3$ is preferably 1549 nm, and $\lambda_4$ is preferably 1533 nm. It is to be understood that the present invention is not limited to any particular wavelength values. The wavelengths in the third window allow for the transmission of data at high speed, on the order of several hundred megabits per second, over distances of tens or hundreds of kilometers before amplification while maintaining the signals at levels sufficient for a correct final reception.

The telemetry service signals are carried at wavelengths $\lambda_5$ and $\lambda_6$ which are different from the wavelengths used for carrying the commercial traffic. In one embodiment of the present invention, the $\lambda_5$ and $\lambda_6$ wavelength pair are preferably 1510 nm and 1480 nm. Alternatively, the wavelength pair of 1510 nm and 1625 nm can be used for the $\lambda_5$ and $\lambda_6$ wavelength pair.

The embodiment shown in FIG. 3 uses two wavelengths to provide for a fully protected bi-directional telemetry service channel. In the preferred embodiment of FIG. 3, one of the wavelengths used for the telemetry service channel wavelength pair is 1510 nm, while the other wavelength in the wavelength pair is a wavelength outside of a 10 nm window (plus or minus 10 nm) of 1510 nm. However, the ITU (International Telecommunications Union) has recently set a standard of 1510 nm plus or minus 10 nm as the standard wavelength for telemetry service signals. To be compatible with the ITU standard, it is therefore preferable to have a bi-directional telemetry service channel that operates in the ITU telemetry wavelength range (1500 nm to 1520 nm). A system that is compatible with the ITU standard for telemetry wavelengths can be provided on a single fiber through the use of a system that allows for bi-directional transmission at a single wavelength.

Figure 5:
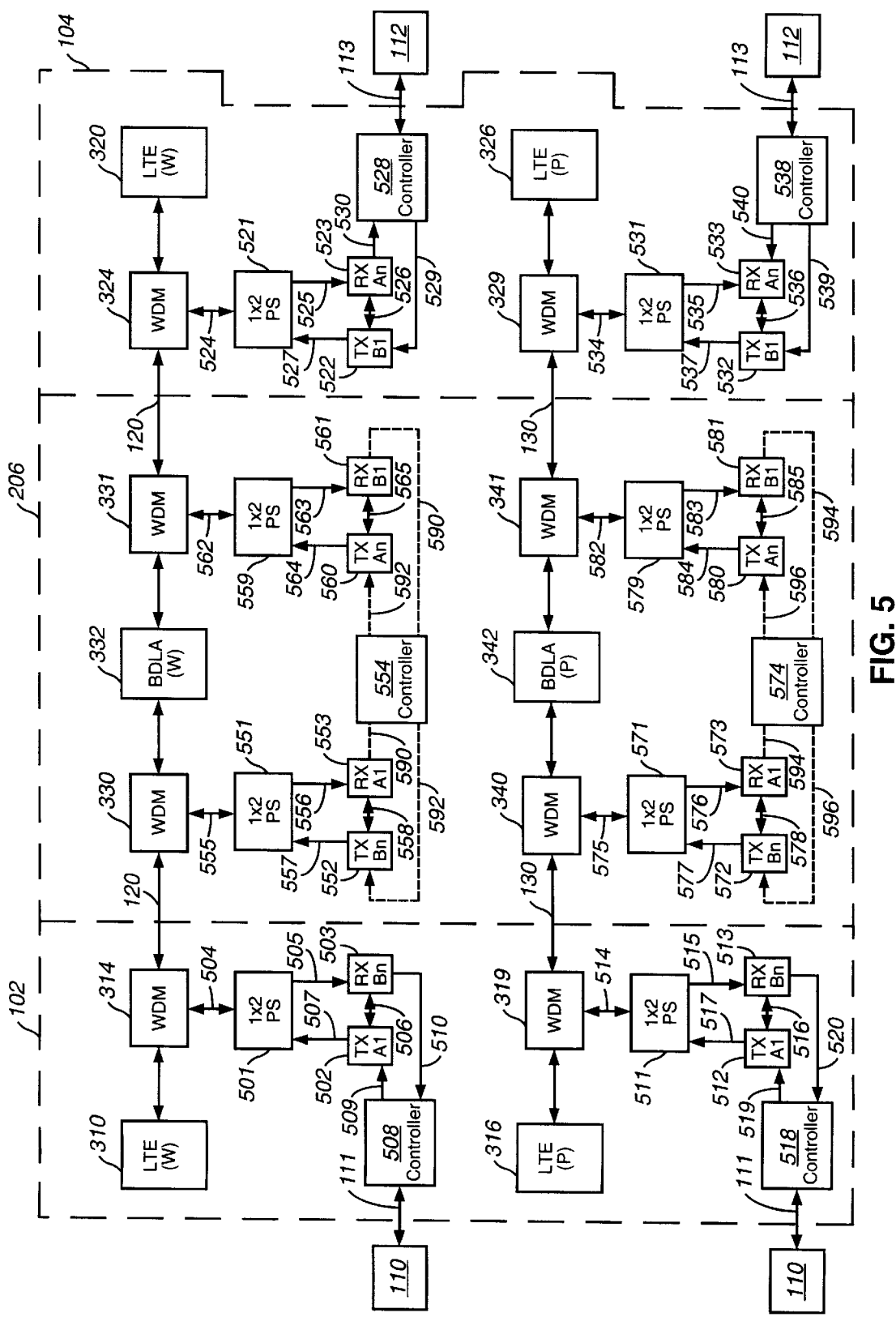
FIG. 5 is a block diagram illustrating an alternate embodiment for providing a bi-directional telemetry service channel.

Turning now to FIG. 5, a block diagram is shown that illustrates an alternate embodiment for providing a bi-directional telemetry service channel. The alternate embodiment shown in FIG. 5 provides a bi-directional telemetry service channel on a single fiber using a single wavelength. As such, the embodiment shown in FIG. 5 can be used to provide a bi-directional telemetry service channel that is compatible with the ITU standard for telemetry service signals by using a single wavelength in the range of 1510 nm plus or minus 10 nm.

FIG. 5 shows a fully protected optical fiber communication system for transmission of customer traffic and telemetry service signals from Site A 102 to Site C 104 using working optical fiber 120 and protection optical fiber 130. One optical repeater site 206 is shown, but it is to be understood that one or more optical repeater sites 206 can be used. In a manner similar to that described above with respect to FIG. 3, Site A 102, Site C 104 and optical repeater site 206 each contain working system equipment and protection system equipment. The working system at Site A 102 includes LTE 310 and multiplexing device 314 as described above. As shown in FIG. 5, multiplexing device 314 is optically coupled via an optical connection 504 to a power splitter 501. Power splitter 501 is a bi-directional device with three ports (1×2), one optical port up-sight to multiplexing device 314, and two optical ports down-sight. Power splitter 501 can also be referred to as a 3 dB coupler because of the 3 dB loss incurred in the device. The power into power splitter 501 is typically split equally on the two output channels. Power splitter 501 is optically coupled via an optical connection 507 to a transmitter (TX) 502. Power splitter 501 is also optically coupled via an optical connection 505 to a receiver (RX) 503. In this manner, light input into power splitter 501 from multiplexing device 314 can be sent to receiver 503. Similarly, light input into power splitter 501 from transmitter 502 can be sent to multiplexing device 314.

Transmitter 502 is a device that is configured to convert electrical signals into optical signals. Receiver 503 is a device that is configured to convert optical signals into electrical signals. Transmitter 502 and receiver 503 are used in order to provide signal processing at Site A 102 in the electrical domain. A controller or control means 508 is used to control operation of transmitter 502 and receiver 503. Electrical signals are sent from controller 508 to transmitter 502 via a connection 509. Electrical signals are sent from receiver 503 to controller 508 via a connection 510. Controller 508 is connected to network control and monitoring equipment 110 via connection 111. An electrical connection 506 is provided between transmitter 502 and receiver 503.

As will be explained in more detail below with respect to the method of operation of the present invention, controller 508 provides for turning on and off transmitter 502 and receiver 503 at the appropriate time to effect the bi-directional transmission of telemetry service signals. Controller 508 receives the telemetry service information that is to be transmitted. Controller 508 formats the telemetry service information into a telemetry service message. Such formatting can include dividing the telemetry service message into a plurality of segments, as well as prioritizing the plurality of segments from highest priority to lowest priority. The formatting performed by controller 508 can also include formatting the electrical telemetry service signals in accordance with a predetermined protocol. Such pre-determined protocols can include, for example, phased-shift keying (PSK) at N levels, with N being at least 2, and N-level QAM (Quadrature Amplitude Modulation), etc. Controller 508 can be implemented using a computer system or a computer controller, such as that described below with respect to FIG. 10.

Site A 102 also includes a protection system having equipment that is substantially identical to that for the working system. A protection power splitter 511 is optically coupled via an optical connection 514 to protection multiplexing device 319. Power splitter 511 is optically coupled via an optical connection 517 to a transmitter 512. Power splitter 511 is optically coupled via an optical connection 515 to a receiver 513. Receiver 513 is connected to transmitter 512 via an electrical connection 516. Transmitter 512 and receiver 513 operate in a similar manner to transmitter 502 and receiver 503 described above. Operation of transmitter 512 and receiver 513 is controlled by a controller 518. Controller 518 is connected to transmitter 512 via an electrical connection 519. Controller 518 is connected to receiver 513 via an electrical connection 520. Controller 518 interfaces with network control and monitoring equipment 110 via connection 111 in like manner to controller 508. Controller 518 performs similar function for transmitter 512 and receiver 513 as controller 508 described above. In an alternate embodiment of the present invention, controllers 508 and 518 can be combined into a single unit.

As described above, Site A 102 includes two transmitters (502 and 512) and two receivers (503 and 513). Alternatively, Site A 102 could be configured with a single transmitter and a single receiver connected by an optical switch. Use of an optical switch could eliminate one transmitter and one receiver at Site A 102. Similarly, use of an optical switch could eliminate one transmitter and one receiver at each of the other sites described below.

Site C 104 contains working equipment and protection equipment similar to that contained at Site A 102. A working power splitter 521 is optically coupled to working multiplexing device 324 via an optical connection 524. A transmitter 522 is optically coupled to power splitter 521 via an optical connection 527. A receiver 523 is optically coupled to power splitter 521 via an optical connection 525. Transmitter 522 is connected to receiver 523 via an electrical connection 526. Operation of transmitter 522 and receiver 523 is controlled by a controller 528. Controller 528 is connected to receiver 523 via an electrical connection 530. Controller 528 is connected to transmitter 522 via an electrical connection 529. Controller 528 is connected to network control and monitoring equipment 112 via connection 113. Controller 528 performs functions analogous to those described above performed by controller 508 and 518.

The protection equipment at Site C 104 is analogous to that at Site A 102. A power splitter 531 is optically coupled to multiplexing device 329 via an optical connection 534. A transmitter 532 is optically coupled to power splitter 531 via an optical connection 537. A receiver 533 is optically coupled to power splitter 531 via an optical connection 535. An electrical connection 536 connects transmitter 532 and receiver 533. Operation of transmitter 532 and receiver 533 is controlled by a controller 538. Receiver 533 is connected to controller 538 via an electrical connection 540. Transmitter 532 is connected to controller 538 via an electrical connection 539. Controller 538 is connected to network control and monitoring equipment 112 via electrical connection 113. In a manner similar to that described above with respect to Site A 102, controller 528 and controller 538 can be combined into a single unit for control and operation of the working and protection receivers and transmitters.

As shown in FIG. 5, optical repeater site 206 includes working equipment as well as protection equipment. The working equipment is illustrated in the upper half of FIG. 5, and the protection equipment is illustrated in the lower half of FIG. 5. In like manner to that described above with respect to Site A 102 and Site C 104, transmitters and receivers are optically coupled to a power splitter which is optically coupled to the multiplexing device. As shown in FIG. 5, a power splitter 551 is optically coupled to multiplexing device 330 via an optical connection 555. A transmitter 552 is optically coupled to power splitter 551 via an optical connection 557. A receiver 553 is optically coupled to power splitter 551 via an optical connection 556. Similarly, a power splitter 559 is optically coupled to multiplexing device 331 via an optical connection 562. A transmitter 560 is optically coupled to power splitter 559 via an optical connection 564. A receiver 561 is optically coupled to power splitter 559 via an optical connection 563.

Operation of transmitter 552, receiver 553, transmitter 560, and receiver 561 is controlled by a controller 554. Controller 554 performs functions at optical repeater site 206 analogous to those functions performed by, for example, controller 508 and controller 528. Controller 554 functions to turn on and off the appropriate transmitters and receivers so that telemetry service signals can be transmitted to and from Sites A and C at the single wavelength on working optical fiber 120. Controller 554 also formats and processes telemetry service signals in the electrical domain. This will be described in more detail below with respect to FIGS. 7, 8A–8C, and 9A–9C. Reference numeral 590 in FIG. 5 identifies electrical signals that are being input into controller 554, and reference numeral 592 identifies electrical signals that are being output out of controller 554. Electrical signals are sent between transmitter 560 and receiver 561 via an electrical connection 565. Electrical signals are sent between transmitter 552 and receiver 553 via an electrical connection 558.

The protection equipment at optical repeater site 206 is substantially the same as or identical to the working equipment described above. A power splitter 571 is optically coupled to multiplexing device 340 via an optical connection 575. A transmitter 572 is optically coupled to connection 577. A receiver 573 is optically coupled to power splitter 571 via an optical connection 576. Similarly, a power splitter 579 is optically coupled to multiplexing device 341 via an optical connection 582. A transmitter 580 is optically coupled to power splitter 579 via an optical connection 584. A receiver 581 is optically coupled to power splitter 579 via an optical connection 583. A controller 574 controls the operation of transmitter 572, receiver 573, transmitter 580, and receiver 581, in a manner similar to that described above for controller 554. Reference numeral 594 indicates electrical signals input to controller 574, and reference numeral 594 indicates electrical signals output from controller 574. Transmitter 572 has an electrical connection 578 to receiver 573. Transmitter 580 has an electrical connection 585 to receiver 581.

In the embodiment shown in FIG. 5, customer traffic (e.g., customer voice, data, video) is carried from Site A 102 to Site C 104 on working optical fiber 120 along the following path: LTE 310; multiplexing device 314; multiplexing device 330; amplification means 332; multiplexing device 331; multiplexing device 324; LTE 320. The customer traffic is carried in this direction along working optical fiber 120. Customer traffic is carried in the opposite direction from Site C 104 to Site A 102 along the same working optical fiber 120 using the following path: LTE 320; multiplexing device 324; multiplexing device 331; amplification means 332; multiplexing device 330; multiplexing device 314; LTE 310. A similar path for bi-directional transmission of customer traffic on protection fiber 130 is used in the embodiment shown in FIG. 5. A description of the customer traffic path on protection fiber 130 has been omitted for brevity.

With reference to FIG. 5, the bi-directional transmission path for telemetry service signals will now be described. A more detailed description of the method for providing the bi-directional transmission of telemetry service signals using the embodiment shown in FIG. 5 will be provided below with respect to FIGS. 7, 8A–C, and 9A–9C. The transmission path will be described with respect to the working equipment shown in the upper half of FIG. 5. A similar transmission path for telemetry service signals is provided by the protection equipment shown in the lower half of FIG. 5.

Telemetry service signals are transmitted from Site A 102 to Site C 104 along the following path. An electrical telemetry service signal is formatted by controller 508 and sent to transmitter 502 for conversion into an optical telemetry service signal. The optical telemetry service signal is transmitted to multiplexing device 314 via power splitter 501. The optical telemetry service signal is then multiplexed onto working optical fiber 120 by multiplexing device 314, and sent to multiplexing device 330. The optical telemetry service signal is then diverted to receiver 553 via power splitter 551. Receiver 553 converts the optical telemetry service signal back into an electrical telemetry service signal for access and processing at optical repeater site 206. The electrical telemetry service signal that is to be sent out of optical repeater site 206 is sent from controller 554 to transmitter 560. Transmitter 560 converts the electrical telemetry service signal into an optical telemetry service signal which is transmitted to multiplexing device 331 via power splitter 559. The optical telemetry service signal is multiplexed onto working optical fiber 120 by multiplexing device 331, and sent to multiplexing device 324. From multiplexing device 324, the optical telemetry service signal is diverted to receiver 523 via power splitter 521. Receiver 523 converts the optical telemetry service signal back into an electrical telemetry service signal for receipt and processing by controller 528.

Telemetry service signals can be sent from Site C 104 to Site A 102 in the following manner. The electrical telemetry service signal is formatted and sent from controller 528 to transmitter 522. Transmitter 522 converts the electrical telemetry service signal into an optical telemetry service signal which is transmitted to multiplexing device 324 via power splitter 521. The optical telemetry service signal is multiplexed onto working optical fiber 120 by multiplexing device 324, and sent to multiplexing device 331. The optical telemetry service signal is diverted to receiver 561 at optical repeater site 206 via power splitter 559. Receiver 561 converts the optical telemetry service signal into an electrical telemetry service signal for receipt and processing by controller 554. The electrical telemetry service signal that is to be further transmitted to Site A 102 is sent from controller 554 to transmitter 552. Transmitter 552 converts the electrical telemetry service signal into an optical telemetry service signal that is transmitted to multiplexing device 330 via power splitter 551. The optical telemetry service signal is then multiplexed onto working optical fiber 120 by multiplexing device 330, and sent to multiplexing device 314. The optical telemetry service signal is then diverted to receiver 503 via power splitter 501. Receiver 503 converts the optical telemetry service signal into an electrical service signal that is input to controller 508 for receipt and processing. The embodiment shown in FIG. 5 thus allows the telemetry service signal to be split out at one or more optical repeater sites for access and processing. Such access and processing is done in the electrical domain through the use of suitable transmitters and receivers.

Suitable transmitters and receivers for use with the present invention are preferably optical digital on-off key ("OOK") transmitters and receivers. The operation and configuration of such transmitters and receivers would be readily apparent to one of skill in the relevant arts. Alternatively, optical sub-carrier modulated transmitters and receivers can be used. For example, 1 GHz microwave carrier can be used to carry the optical telemetry service signal at a particular wavelength, such as 1510 nm. The telemetry service information is encoded on the carrier frequency by amplitude modulation. Through the use of the "walkie-talkie" method of the present invention, the same carrier frequency and same wavelength can be used for the bi-directional transmission of the telemetry service signal. Alternatively, a separate carrier, such as 2 GHz, can be used in the opposite direction, allowing for simultaneous operation of transmitters and receivers. For example, AM-VSB (amplitude modulation-vestigal side band) sub-carrier modulation transmitters and receivers can be used. Different sub-carriers are used in each direction, for example, 500 MHZ in one direction and 600 MHZ in the opposite direction. This allows for simultaneous operation of transmitters and receivers for bi-directional transmission at the same wavelength. As yet another alternative, optical frequency modulation (FM) transmitters and receivers can be used. Such FM transmitters and receivers use, for example, 88–108 MHz as a carrier frequency. The telemetry service information is encoded on the carrier frequency by frequency modulation.

Figure 6:
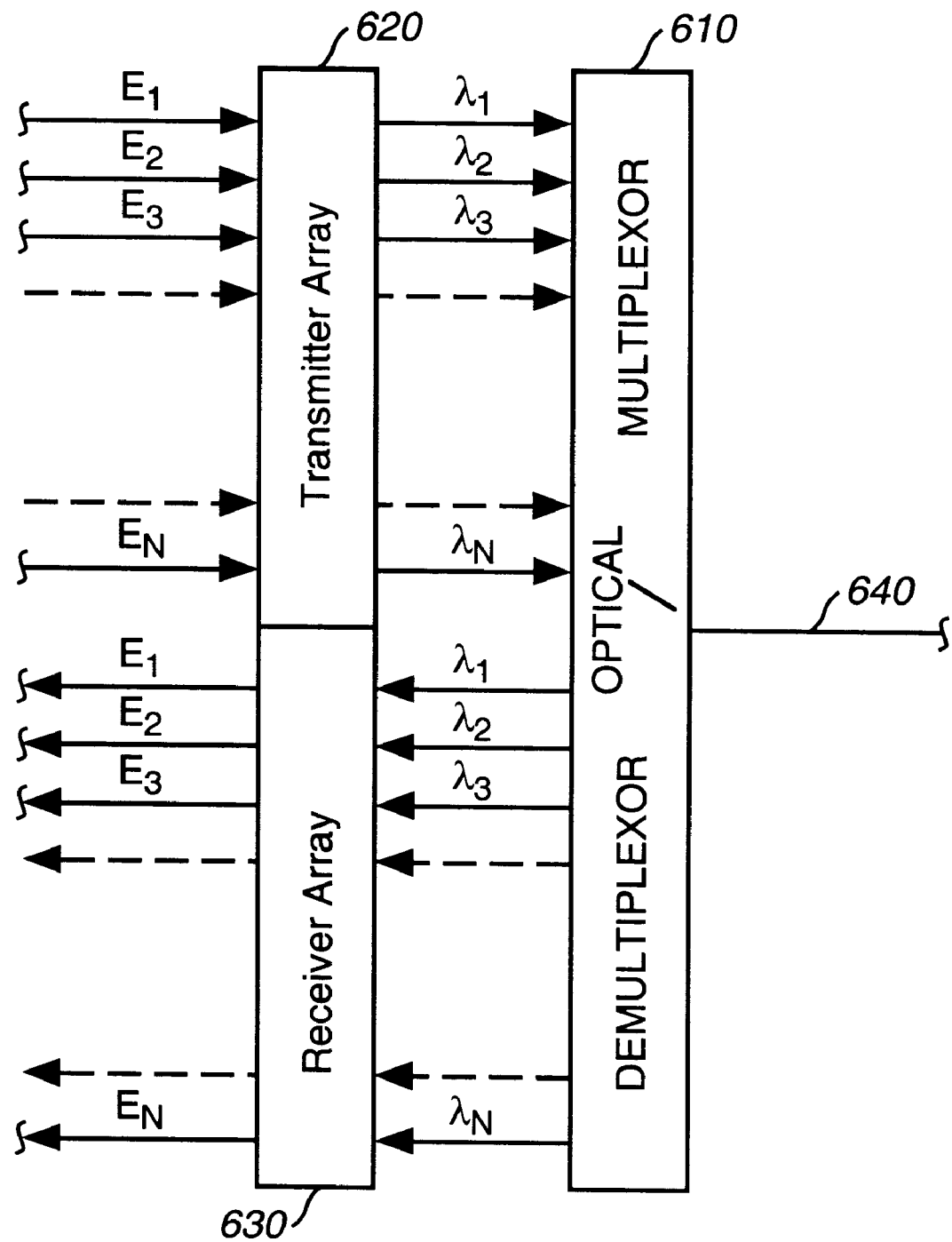
FIG. 6 is a block diagram illustrating one embodiment of line terminating equipment suitable for use with the present invention.

Suitable LTE/BOSC equipment for use with the present invention is illustrated in FIG. 6. An optical demultiplexor/ multiplexor 610 is optically coupled to an optical fiber 640. Optical fiber 640 carries light at multiple wavelengths, i.e., $\lambda_1, \lambda_2, \lambda_3, \lambda_n$. Optical fiber 640 represents a working or protection optical fiber used in the optical fiber communication system of the present invention. Optical demultiplexor/multiplexor (demux/mux) 610 is a multiplexing device such as those described above. Demux/mux 610 combines light of varying wavelengths to be carried by optical fiber 640, and separates out wavelengths of light that are carried by optical fiber 640. To transmit signals at varying wavelengths, electrical signals $\lambda_1, \lambda_2, \lambda_3, \lambda_n$, are input into a transmitter array 620. Transmitter array 620 contains suitable transmitters, such as lasers, to inject light of corresponding wavelengths using the input electrical signals. Similarly, wavelengths $\lambda_1, \lambda_2, \lambda_3, \lambda_n$, are separated out by demux/mux 610, and input into a receiver array 630. Receiver array 630 then converts the corresponding wavelengths into individual electrical signals $E_1, E_2, E_3, E_n$.

Figure 10:
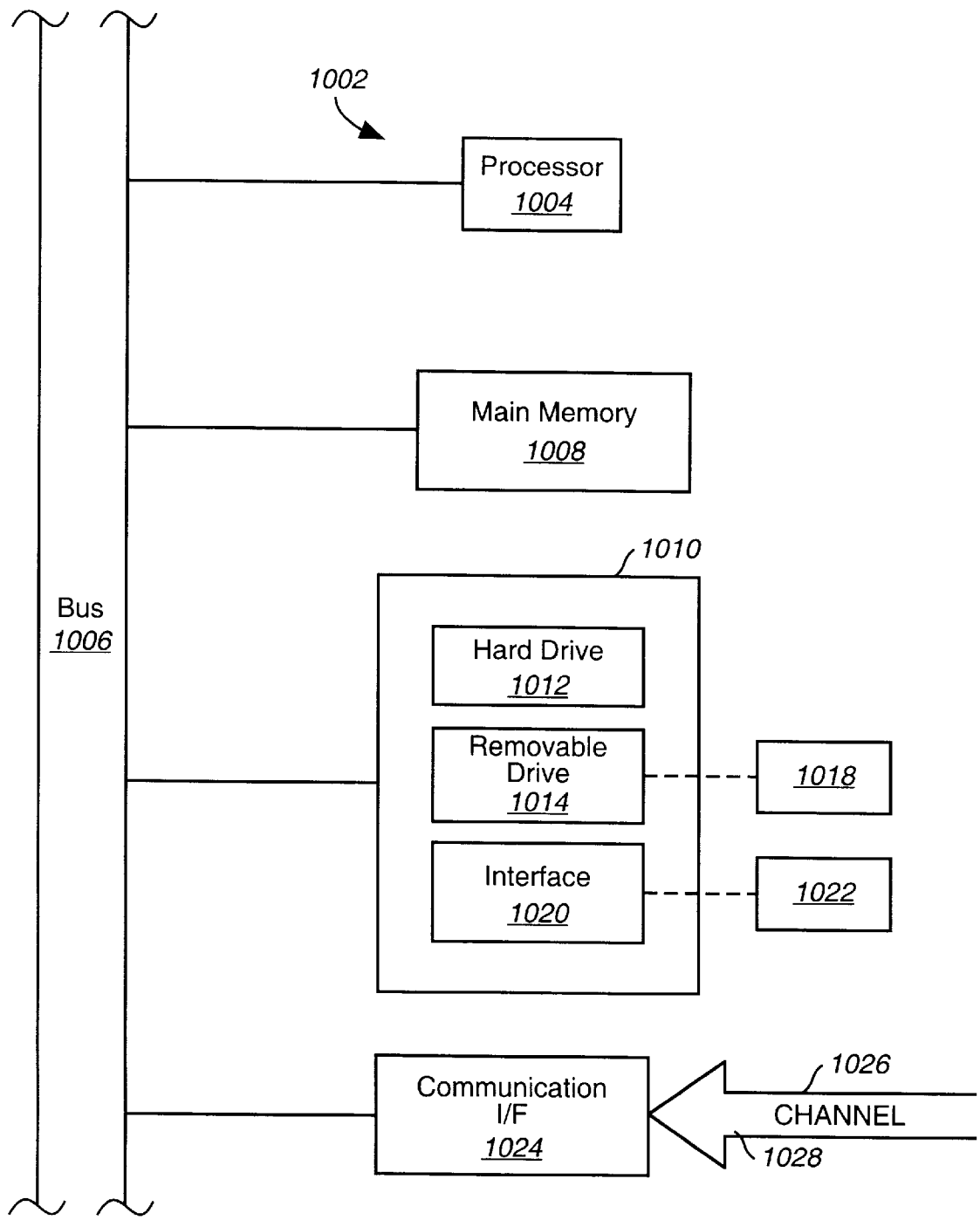
FIG. 10 shows one embodiment of a computer system suitable for use with the present invention.

The present invention may be implemented using hardware, software or a combination thereof and may be implemented in a computer system or other processing system. In one embodiment, the invention is directed toward a computer system capable of carrying out the functionality described herein. An exemplary computer system 1002 is shown in FIG. 10. The functions performed by controllers 508, 554, 528, 518, 574, and 538 can be implemented using one or more computer systems 1002. Computer system 1002 includes one or more processors, such as processor 1004. Processor 1004 is connected to a communication bus 1006. Various software embodiments are described in terms of this example computer system. After reading this description, it will become apparent to a person skilled in the relevant art how to implement the invention using other computer systems and/or computer architectures.

Computer system 1002 also includes a main memory 1008, preferably random access memory (RAM), and can also include a secondary memory 1010. Secondary memory 1010 can include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well known manner.

Removable storage unit 1018 represents a floppy disk, magnetic tape, optical disk, etc. which is read by and written to by removable storage drive 1014. As will be appreciated, removable storage unit 1018 includes a computer usable storage medium having stored therein computer software and/or data.

In alternative embodiments, secondary memory 1010 may include other similar means for allowing computer programs or other instructions to be loaded into computer system 1002. Such means can include, for example, a removable storage unit 1022 and an interface 1020. Examples of such can include a program cartridge and cartridge interface (such as that found in video game devices), a removable memory chip (such as an EPROM, or PROM) and associated socket, and other removable storage units 1022 and interfaces 1020 which allow software and data to be transferred from removable storage unit 1022 to computer system 1002.

Computer system 1002 can also include a communications interface 1024. Communications interface 1024 allows software and data to be transferred between computer system 1002 and external devices. Examples of communications interface 1024 can include a modem, a network interface (such as an Ethernet card), a communications port, a PCMCIA slot and card, etc. Software and data transferred via communications interface 1024 are in the form of signals 1026 which can be electronic, electromagnetic, optical or other signals capable of being received by communications interface 1024. Signals 1026 are provided to communications interface via a channel 1028. Channel 1028 carries signals 1026 and can be implemented using wire or cable, fiber optics, a phone line, a cellular phone link, an RF link and other communications channels.

In this document, the terms "computer program medium" and "computer usable medium" are used to generally refer to media such as removable storage device 1018, a hard disk installed in hard disk drive 1012, and signals 1026. These computer program products are means for providing software to computer system 1002.

Computer programs (also called computer control logic) are stored in main memory and/or secondary memory 1010. Computer programs can also be received via communications interface 1024. Such computer programs, when executed, enable computer system 1002 to perform the features of the present invention as discussed herein. In particular, the computer programs, when executed, enable processor 1004 to perform the features of the present invention.

Accordingly, such computer programs represent controllers of the computer system 1002.

In an embodiment where the invention is implemented using software, the software may be stored in a computer program product and loaded into computer system 1002 using removable storage drive 1014, hard drive 1012 or communications interface 1024. The control logic (software), when executed by processor 1004, causes processor 1004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Operation of the Present Invention

The operation of the present invention will now be described with respect to FIGS. 7, 8A through 8C, and 9A through 9C. The method and operation that will now be described can be carried out using the apparatus described above with respect to FIG. 5 and FIG. 6.

Figure 7:
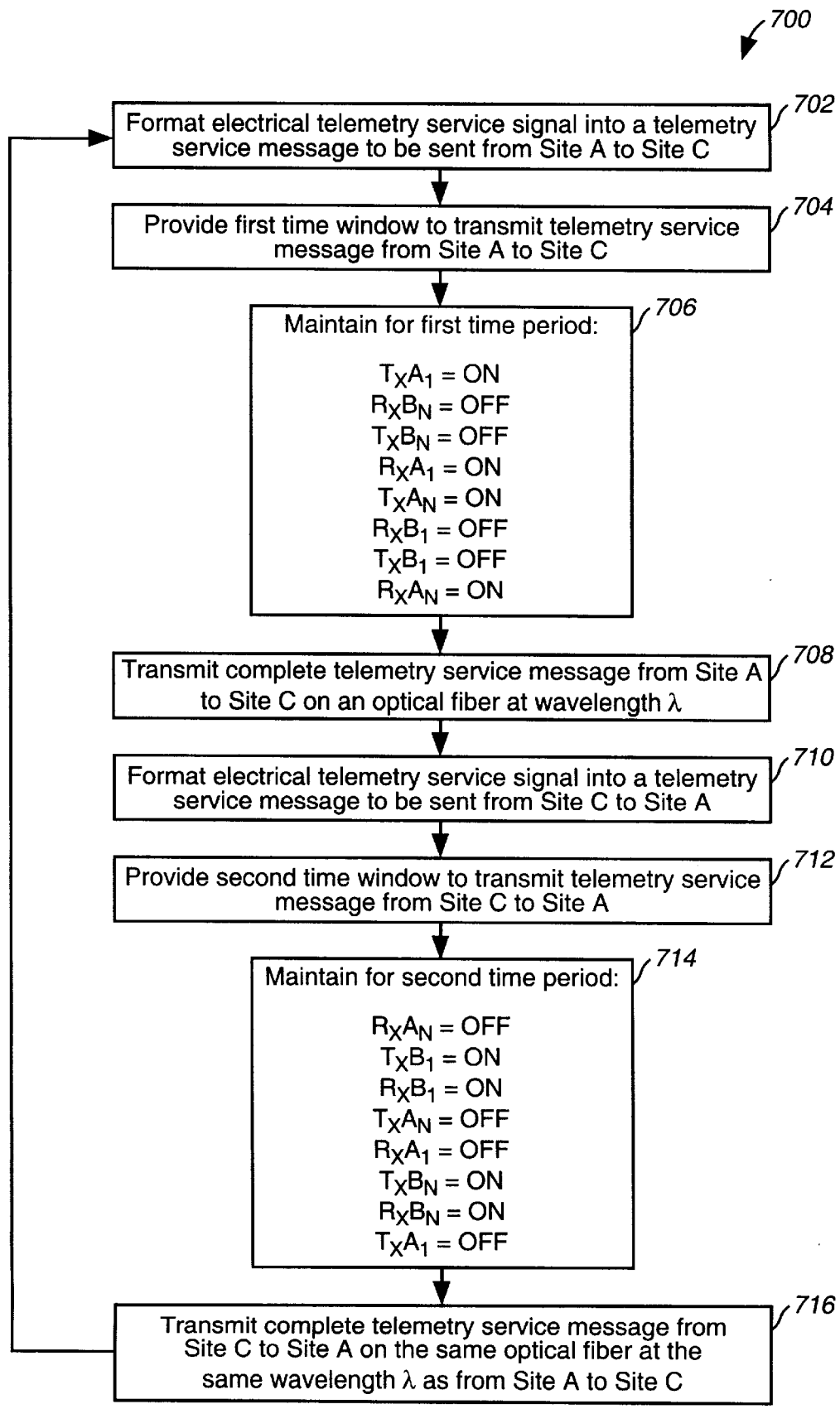
FIG. 7 is a flow chart illustrating one embodiment of a method for providing a bi-directional telemetry service channel on a single optical fiber at a single wavelength.

Turning now to FIG. 7, a flowchart 700 is shown for one embodiment for providing a bi-directional telemetry service channel on a single optical fiber at a single wavelength. In a step 702, an electrical telemetry service signal is formatted into a telemetry service message to be sent from Site A to Site C. Such formatting can be carried out, for example, by controller 508 or controller 518 shown in FIG. 5. In a step 704, a first time window is provided for transmitting the telemetry service message from Site A to Site C. The first time window can be provided by, as shown in a step 706, maintaining the following conditions of the receivers and transmitters shown in FIG. 5 for the first time period: $T_XA_1$ is on; $R_XB_N$ is off; $T_XB_N$ is off; $R_XA_1$ is on; $T_XA_N$ is on; $R_XB_1$ is off; $T_XB_1$ is off; and $R_XA_N$ is on.

In a step 708, the complete telemetry service message is transmitted from Site A to Site C on an optical fiber (such as working optical fiber 120 or protection optical fiber 130) at a wavelength $\lambda$.

In a step 710, an electrical telemetry service signal is formatted into a telemetry service message to be sent from Site C to Site A. A second time window is provided in a step 712 to transmit the telemetry service message from Site C to Site A. The second time window is provided by, as shown in a step 714, maintaining for a second time period the following conditions for the receivers and transmitters shown in FIG. 5: $R_XA_N$ is off; $T_XB_1$ is on; $R_XB_1$ is on; $T_XA_N$ is off; $R_XA_1$ is off; $T_XB_N$ is on; $R_XB_N$ is on; and $T_XA_1$ is off.

In a step 716, the complete telemetry service message is transmitted from Site C to Site A using the same optical fiber and the same wavelength as was used in step 708 for transmitting the telemetry service message from Site A to Site C. The method then returns to step 702, to format the telemetry service signal into the telemetry service message to be sent from Site A to Site C. In this manner, complete messages are alternately sent from Site A to Site C (i.e., in one direction) and then a complete telemetry service message is sent in the opposite direction, from Site C to Site A. This "walkie-talkie" method for sending of telemetry service messages in a "ping-pong" fashion allows for the bi-directional transmission of telemetry service signals on a single fiber using only a single wavelength. The time period for the first time window can be the same as, or different from, the time period for the second time window. For example, the first time period can be two minutes, and the second time period can be three minutes. It is to be understood that the present invention is not limited to any particular time period for the time windows.

Figure 8A:
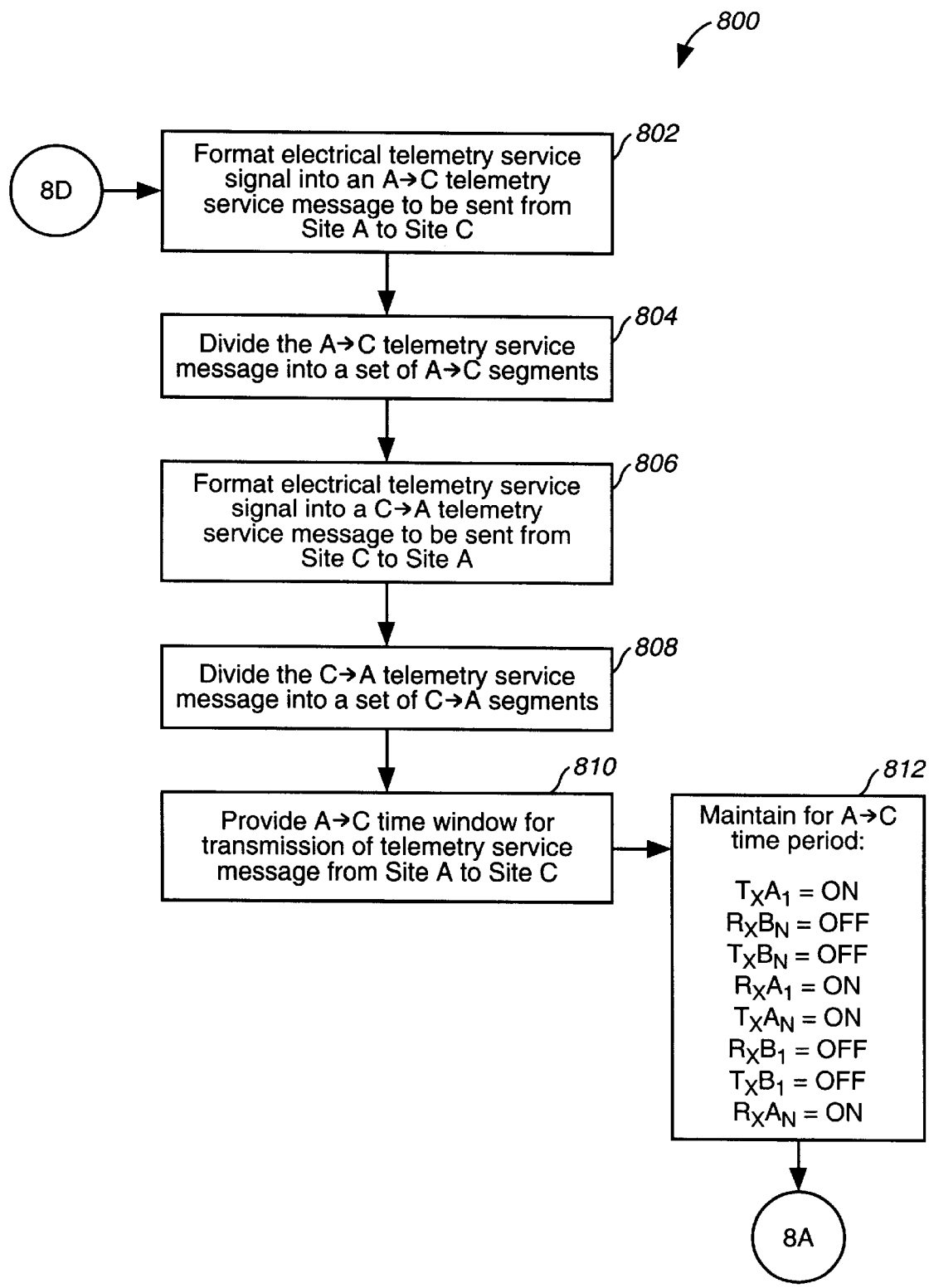
FIGS. 8A–8C show a flow chart illustrating an alternate embodiment of a method for providing a bi-directional telemetry service channel on a single optical fiber at a single wavelength.
Figure 8B:
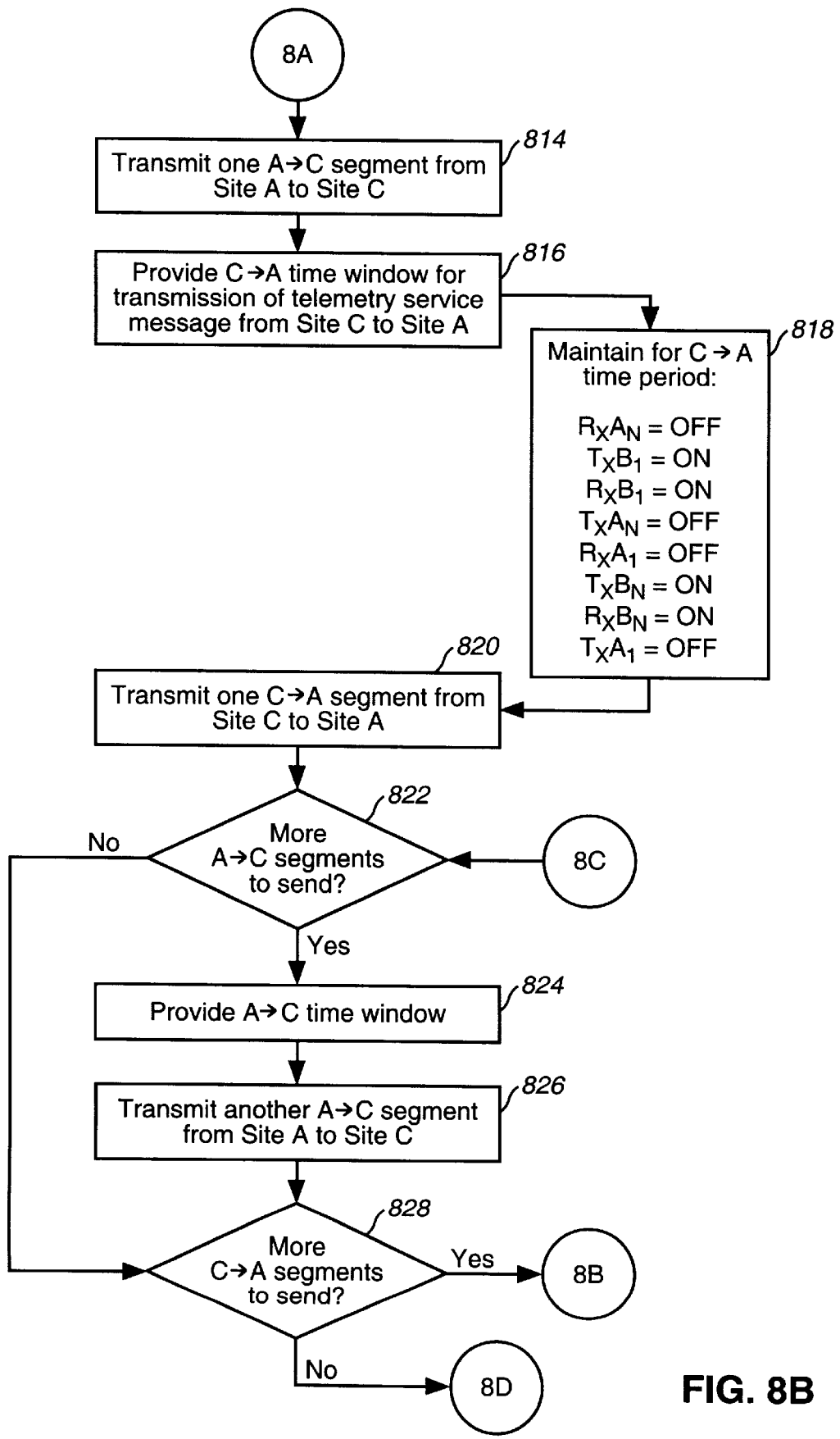
Figure 8C:
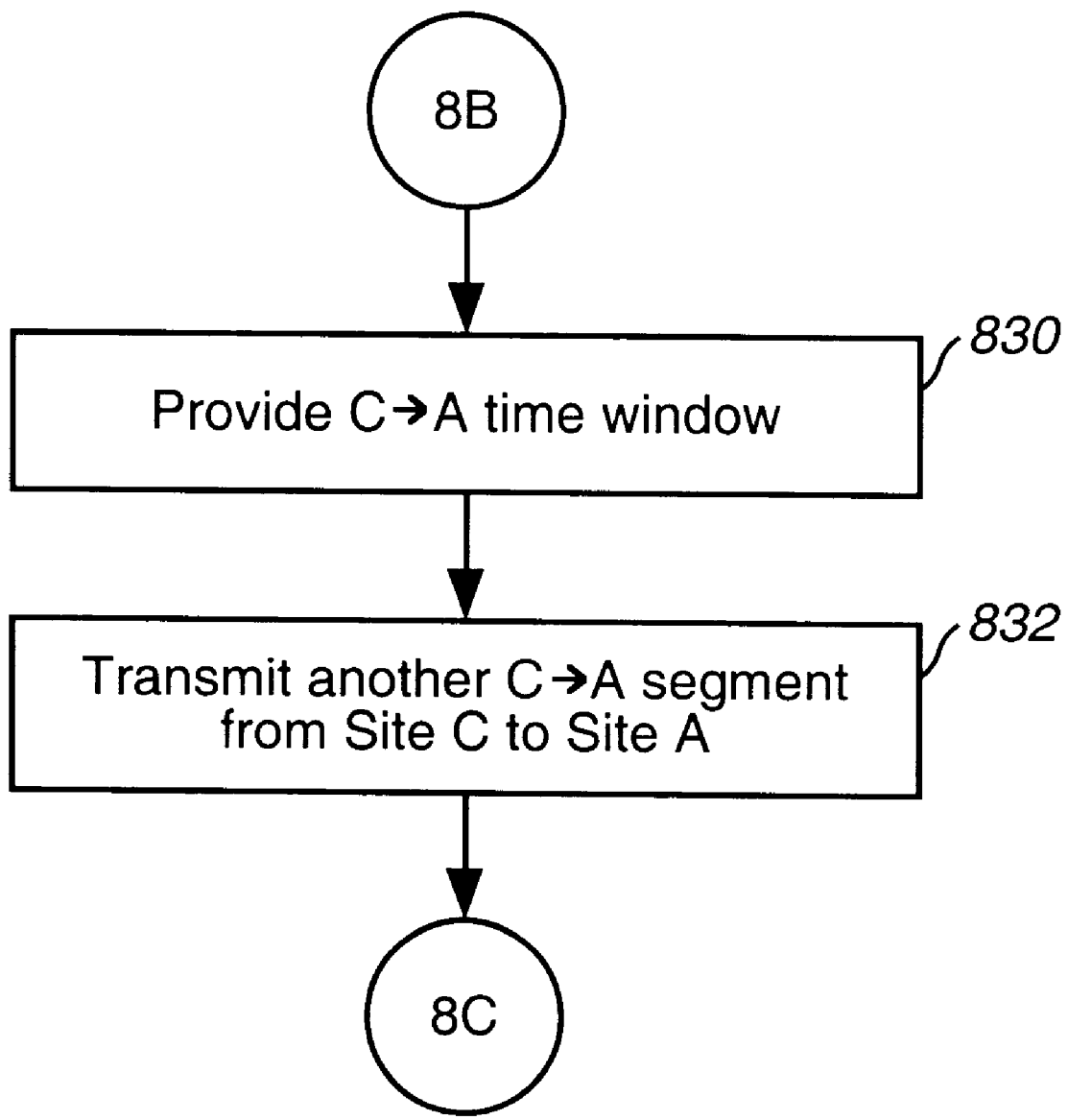

An alternate embodiment of a method for providing a bi-directional telemetry service channel on a single optical fiber at a single wavelength is illustrated in FIGS. 8A through 8C. Turning now to FIG. 8A, a flowchart 800 begins with a step 802. In step 802, an electrical telemetry service signal is formatted into an A→C telemetry service message to be sent from Site A to Site C. In a step 804, the A→C telemetry service message is divided into a set of A→C segments. Steps 802 and 804 can be carried out, for example, by controller 508 and 518 as shown in FIG. 5.

In a step 806, an electrical telemetry service signal is formatted into a C→A telemetry service message to be sent from Site C to Site A. In a step 808, the C→A telemetry service message is divided into a set of C→A segments. Steps 806 and 808 can be carried out, for example, using controller 528 or controller 538 as shown in FIG. 5.

In a step 810, an A→C time window is provided for transmission of telemetry service message from Site A to Site C. The A→C time window is provided by, as shown in a step 812, maintaining the following conditions for an A→C time period: $T_XA_1$ is on; $R_XB_N$ is off; $T_XB_N$ is off; $R_XA_1$ is on; $T_XA_N$ is on; $R_XB_1$ is off; $T_XB_1$ is off; and $R_XA_N$ is on. Processing then continues in FIG. 8B by way of flowchart connector 8A.

With reference now to FIG. B, processing continues at a step 814. In step 814, one A→C segment is transmitted from Site A to Site C.

In a step 816, a C→A time window is provided for transmission of telemetry service message from Site C to Site A. The C→A time window is provided by maintaining, as shown in a step 818, the following conditions for a C→A time period: $R_XA_N$ is off; $T_XB_1$ is on; $R_XB_1$ is on; $T_XA_N$ is off; $R_XA_1$ is off; $T_XB_N$ is on; $R_XB_N$ is on; and $T_XA_1$ is off.

In a step 820, one C→A segment is transmitted from Site C to Site A.

In a decision step 822, it is determined whether there are more A→C segments to send. If there are more A→C segments to send, then processing continues at a step 824. In step 824, an A→C time window is provided. Step 824 can be carried out in the same manner as step 810 by maintaining the conditions indicated in step 812. Processing then continues at a step 826. In step 826, another A→C segment is transmitted from Site A to Site C.

Processing then continues at a step 828. If in step 822 there were no more A→C segments to send, then processing also continues to step 828. In decision step 828, it is determined whether there are more C→A segments to send. If there are more C→A segments to send, then processing continues in FIG. 8C in a step 830 by way of a flowchart connector 8B.

In step 830, a C→A time window is provided. Step 830 can be carried out in similar manner to step 816 by maintaining the conditions indicated in step 818.

In a step 832, another C→A segment is transmitted from Site C to Site A.

Processing then continues back at step 822 in FIG. 8B by way of a flowchart connector 8C.

If in step 828, it was determined that there are no more C→A segments to send, then processing returns to step 802 at the beginning of flowchart 800 by way of a flowchart connector 8D. Once all A→C segments have been transmitted, as determined in step 822, and all C→A segments have been transmitted, as determined in step 828, then processing returns to the beginning of flowchart 800 in step 802.

As can be seen from flowchart 800, in this embodiment, the method of the present invention divides the telemetry service message that is transmitted in each direction into segments. The segments are then alternately transmitted in each direction until all of the segments have been transmitted. In this manner, the complete message is eventually transmitted in each direction. This method is analogous to an ATM (asynchronous transfer mode) protocol. Using such an ATM protocol, the telemetry service message is divided into segments or "payload." An address or other header information can then be added to each segment or payload for transmission in the appropriate direction.

Figure 9A:
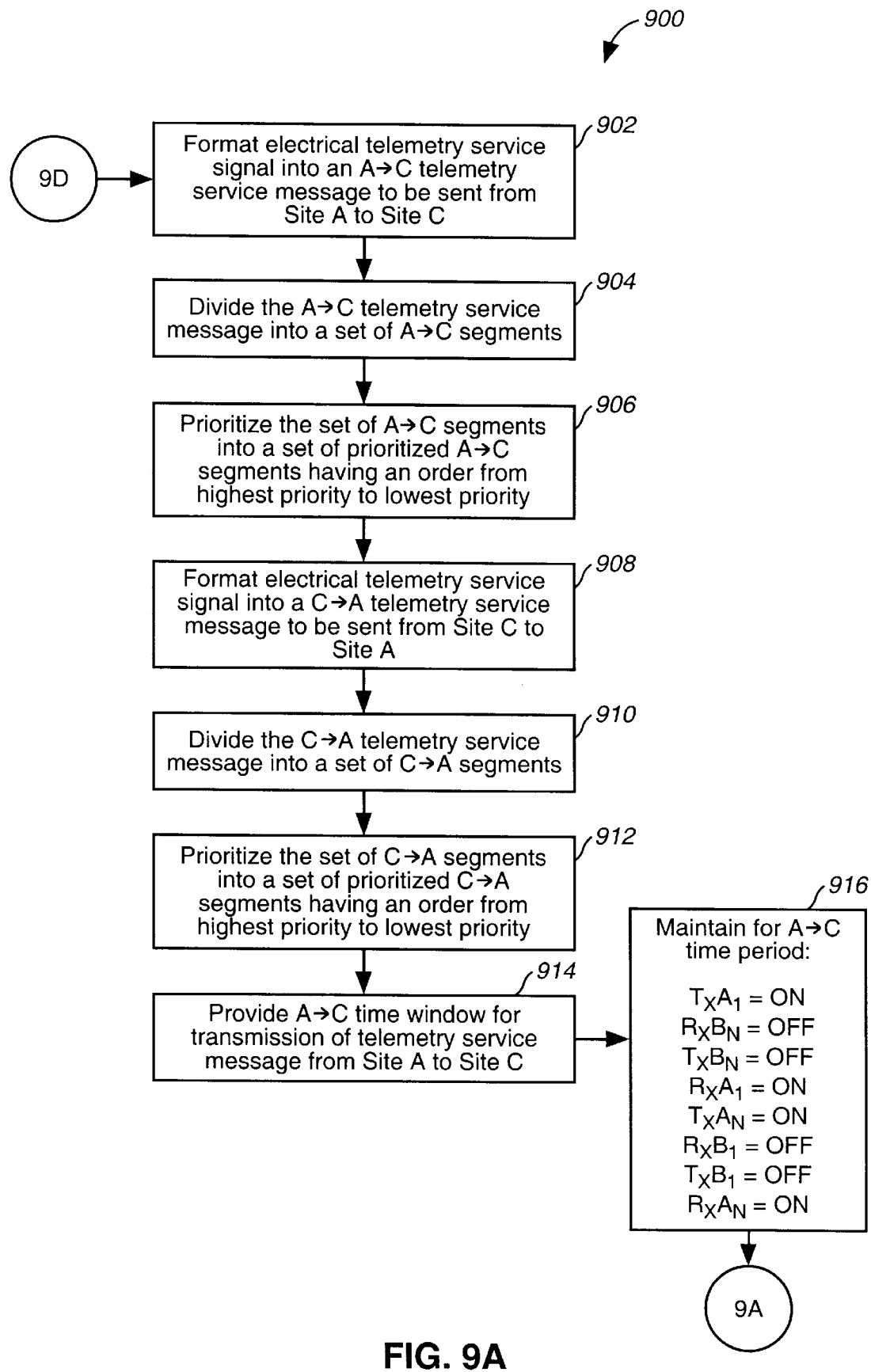
FIGS. 9A–9C show a flow chart illustrating another embodiment of a method for providing a bi-directional telemetry service channel on a single optical fiber at a single wavelength.
Figure 9B:
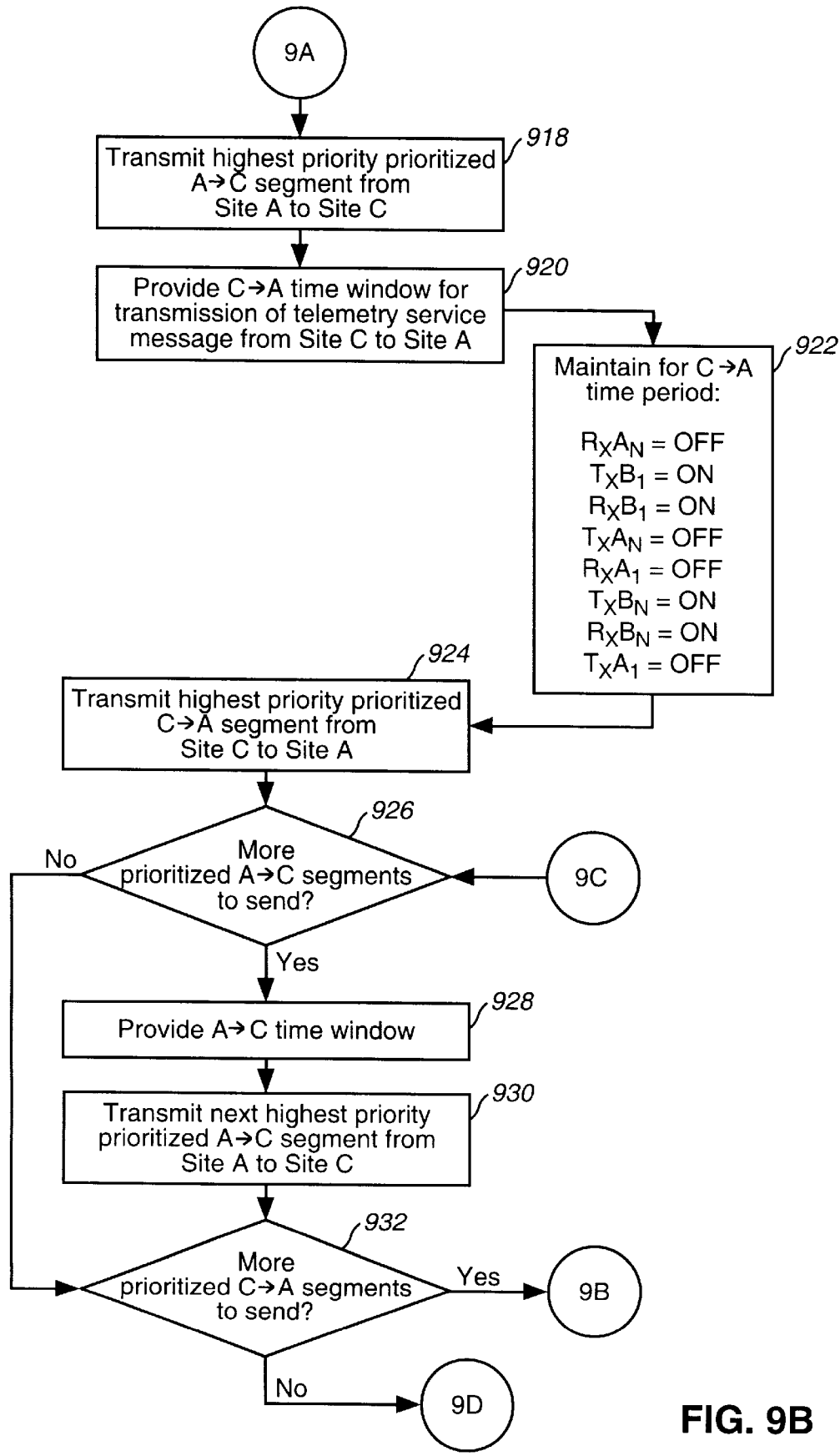
Figure 9C:
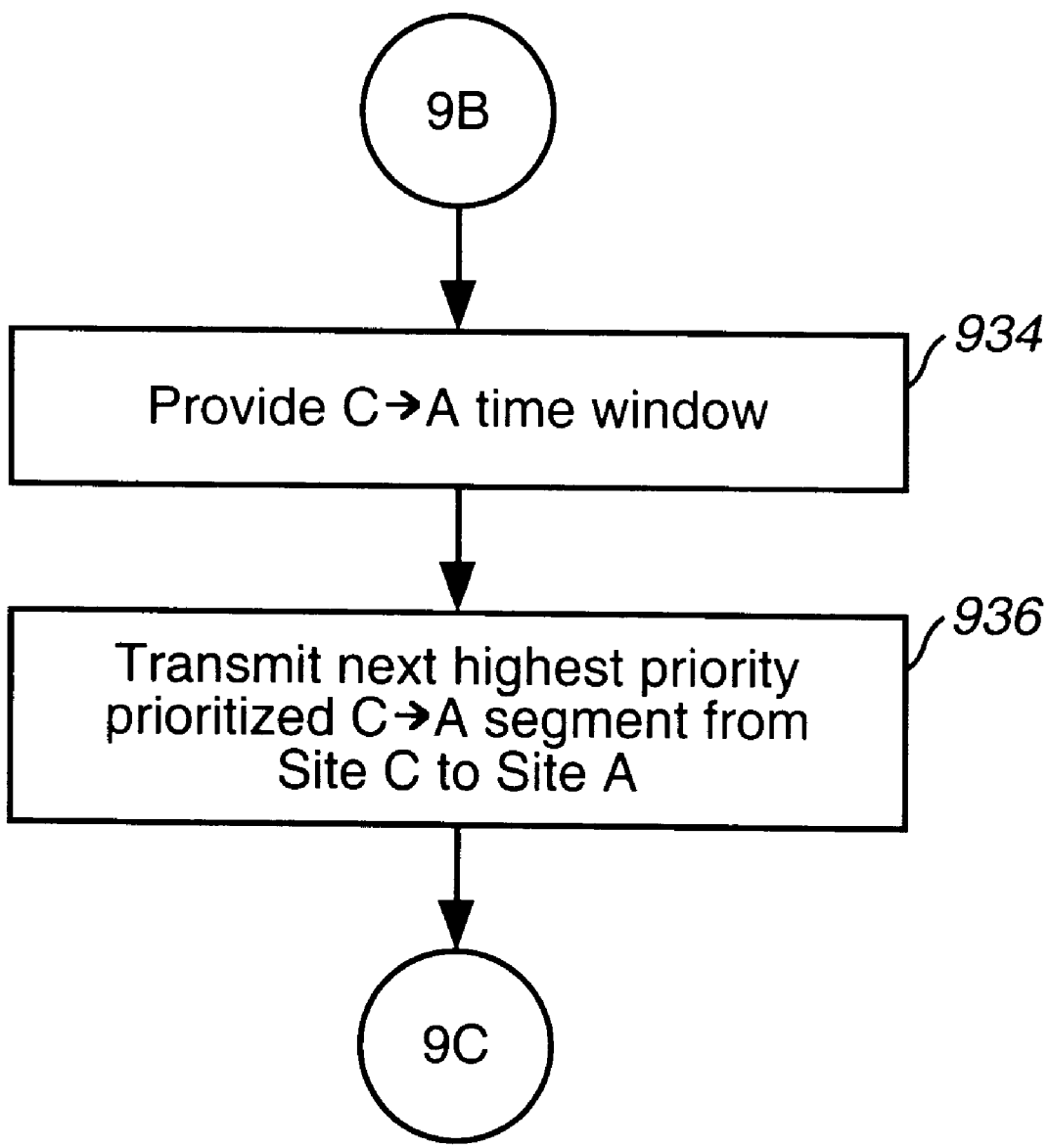

With reference now to FIGS. 9A through 9C, another embodiment of a method for providing a bi-directional telemetry service channel on a single optical fiber at a single wavelength is shown in a flowchart 900. In a step 902, an electrical telemetry service signal is formatted into an A→C telemetry service message to be sent from Site A to Site C. In a step 904, the A→C telemetry service message is divided into a set of A→C segments. In a step 906, the set of A→C segments is prioritized into a set of prioritized A→C segments having an order from highest priority to lowest priority. Steps 902, 904, and 906 can be carried out, for example, using controller 508 or controller 518 shown in FIG. 5.

In a step 908, an electrical telemetry service signal is formatted into a C→A telemetry service message to be sent from Site C to Site A. In a step 910, the C→A telemetry service message is divided into a set of C→A segments. In a step 912, the set of C→A segments is prioritized into a set of prioritized C→A segments having an order from highest priority to lowest priority. Steps 908, 910, and 912, can be carried out, for example, using controller 528 or 538 shown in FIG. 5.

In a step 914, an A→C time window is provided for transmission of telemetry service message from Site A to Site C. Step 914 is carried out by maintaining, as shown in a step 916, the following conditions for an A→C time period: $T_X A_1$ is on; $R_X B_N$ is off; $T_X B_N$ is off; $R_X A_1$ is on; $T_X B_1$ is off; $T_X B_1$ is off, and $R_X A_N$ is on. Processing then continues in a step 918 by way of flowchart connecter 9A.

As shown in FIG. 9B, in step 918, the highest priority prioritized A→C segment is transmitted from Site A to Site C.

In a step 920, a C→A time window is provided for transmission of telemetry service message from Site C to Site A. The C→A time window is provided by maintaining, as shown in a step 922, the following conditions for a C→A time period: $R_X A_N$ is off; $T_X B_1$ is on; $R_X B_1$ is on; $T_X A_N$ is off; $R_X A$, is off; $T_X B_N$ is on; $R_X B_N$ is on; and $T_X A_1$ is off.

In a step 924, the highest priority prioritized C→A segment is transmitted form Site C to Site A.

In a decision step 926, it is determined whether there are more prioritized A→C segments to send. If there are more prioritized A→C segments to send, then processing continues to a step 928. In step 928, an A→C time window is provided. The time window provided in step 928 can be carried out in the same manner as step 914 by maintaining the conditions shown in step 916. In a step 930, the next highest priority prioritized A→C segment is transmitted from Site A to Site C. Processing then continues to a decision step 932.

If it is determined in step 926 that there are no more prioritized A→C segments to send, then processing also continues to decision step 932. In decision step 932, it is determined whether there are more prioritized C→A segments to send. If there are more prioritized C→A segments to send, then processing continues to a step 934 shown in FIG. 9C by way of a flowchart connector 9B. In step 934, a C→A time window is provided. The C→A time window provided in step 934 can be carried out in the same manner as the C→A time window provided in step 920 by maintaining the conditions shown in step 922. In a step 936, the next highest priority prioritized C→A segment is transmitted from Site C to Site A. Processing then continues at step 926 by way of a flowchart connector 9C.

If in decision step 932, it is determined that there are no more prioritized C→A segments to send, then processing returns to the beginning of flowchart 900 at step 902 by way of a flowchart connector 9D. Once all prioritized A→C segments have been transmitted, as determined in step 926, and all prioritized C→A segments have been transmitted, as determined in step 932, then processing returns to the beginning of flowchart 900 at step 902.

Through use of the method shown in FIGS. 9A to 9C, telemetry service messages are sent bi-directionally in segments by alternating the sending of segments in each direction. In this aspect, this embodiment is similar to that shown in FIGS. 8A through 8C. However, in the embodiment shown in FIGS. 9A to 9C, the most critical or highest priority information is sent first. The highest priority segments of the telemetry service message are the first segments to be sent in each direction. The segments are then alternately sent in each direction in priority order, that is, from highest priority to lowest priority.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An optical fiber communication system for the bi-directional transmission of communication and telemetry service signals, comprising:

a first multiplexing device, wherein said first multiplexing device sends optical communication signals of a first wavelength and receives optical communication signals of a second wavelength, sends optical telemetry service signals of a third wavelength, and receives optical telemetry service signals of a fourth wavelength;

a second multiplexing device, wherein said second multiplexing device receives the optical communication signals of the first wavelength, sends the optical communication signals of the second wavelength, receives the optical telemetry service signals of the third wavelength, and sends the optical telemetry service signals of the fourth wavelength;

an optical fiber optically coupled to said first multiplexing device and to said second multiplexing device for carrying the optical telemetry service signals at the third and fourth wavelengths;

optical amplification means for bi-directional amplification of optical signals carried by said optical fiber, wherein said optical amplification means is optically coupled to said optical fiber between said first multiplexing device and said second multiplexing device; and a third and fourth multiplexing device, each optically coupled to said optical fiber and said amplification means, for sending and receiving optical signals from said first and second multiplexing devices, respectively.

2. The optical fiber communication system of claim 1, wherein the third wavelength is substantially equal to 1510 nm and the fourth wavelength is substantially equal to 1480 nm.

3. The optical fiber communication system of claim 1, wherein the third wavelength is substantially equal to 1510 nm, and the fourth wavelength is substantially equal to 1625 nm.

4. An optical fiber communication system for the bi-directional transmission of communication and telemetry service signals, comprising:

a first multiplexing device, wherein said first multiplexing device sends optical communication signals of a first wavelength and receives optical communication signals of a second wavelength, sends optical telemetry service signals of a third wavelength, and receives optical telemetry service signals of a fourth wavelength;

a second multiplexing device, wherein said second multiplexing device receives the optical communication signals of the first wavelength, sends the optical communication signals of the second wavelength, receives the optical telemetry service signals of the third wavelength, and sends the optical telemetry service signals of the fourth wavelength;

an optical fiber optically coupled to said first multiplexing device and to said second multiplexing device for carrying the optical telemetry service signals at the third and fourth wavelengths; and optical amplification means for amplifying optical signals carried by said optical fiber, wherein said optical amplification means is optically coupled to said optical fiber between said first multiplexing device and said second multiplexing device and wherein said optical amplification means comprises:

a bi-directional line amplifier;

a third multiplexing device optically coupled to said optical fiber and to said bi-directional line amplifier for sending and receiving optical communication signals and optical telemetry service signals to and form said first multiplexing device; and a fourth multiplexing device optically coupled to said optical fiber and to said bi-directional line amplifier for sending and receiving optical communication signals and optical telemetry service signals to and from said second multiplexing device.

5. An optical fiber communication system for the bi-directional transmission of communication and telemetry service signals, comprising:

a first multiplexing device, wherein said first multiplexing device sends optical communication signals of a first wavelength and receives optical communication signals of a second wavelength, sends optical telemetry service signals of a third wavelength, and receives optical telemetry service signals of a fourth wavelength;

a second multiplexing device, wherein said second multiplexing device receives the optical communication signals of the first wavelength, sends the optical communication signals of the second wavelength, receives the optical telemetry service signals of the third wavelength, and sends the optical telemetry service signals of the fourth wavelength;

an optical fiber optically coupled to said first multiplexing device and to said second multiplexing device for carrying the optical telemetry service signals at the third and fourth wavelengths; and optical amplification means for amplifying optical signals carried by said optical fiber, wherein said optical amplification means is optically coupled to said optical fiber between said first multiplexing device and said second multiplexing device and wherein said optical amplification means comprises:

a line regenerator;

a third multiplexing device optically coupled to said optical fiber and to said line regenerator for sending and receiving optical communication signals and optical telemetry service signals to and from said first multiplexing device; and a fourth multiplexing device optically coupled to said optical fiber and to said line regenerator for sending and receiving optical communication signals and optical telemetry service signals to and from said second multiplexing device.

* * * * *